April 11, 1950    C. R. LINDQUIST    2,503,673
CAKE DECORATOR AND FINISHING MACHINE
Filed July 21, 1947    3 Sheets-Sheet 1
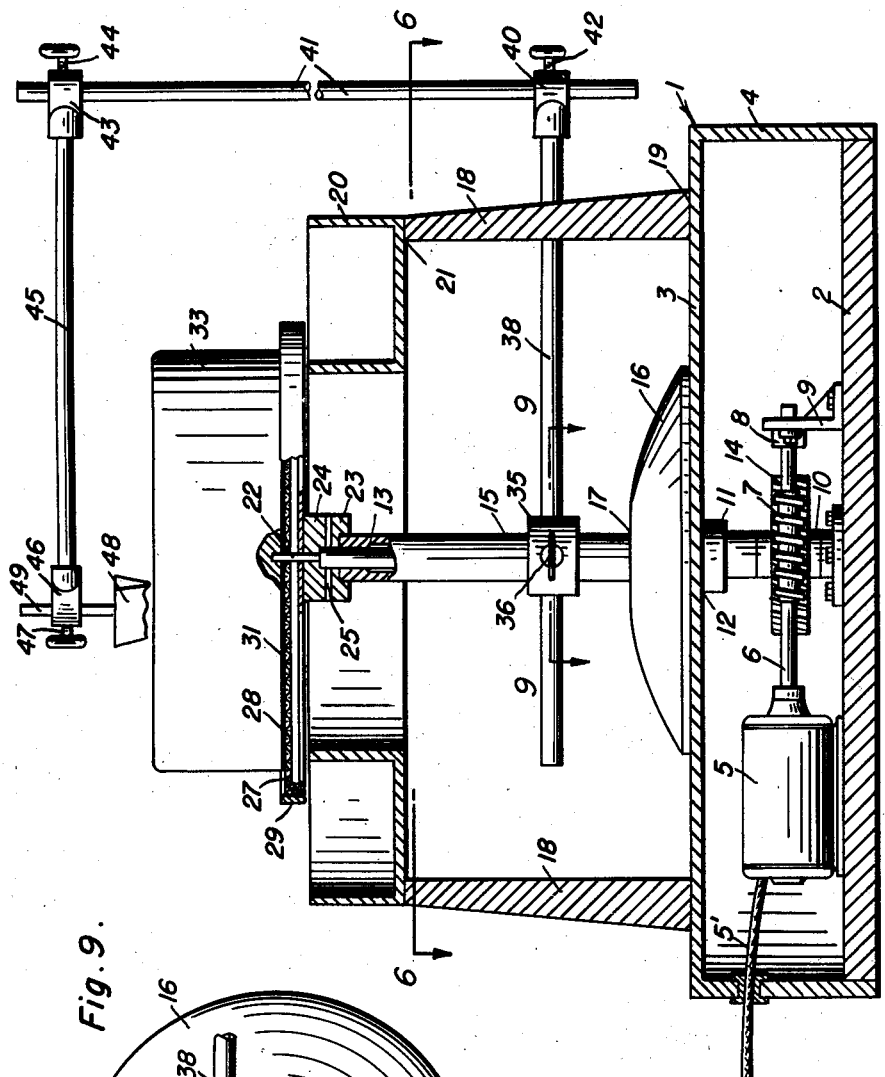
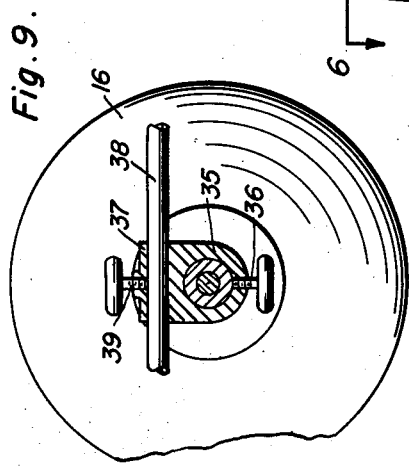
Inventor
Carl Richard Lindquist
By *Clarence A. O'Brien and Harvey B. Jacobson*
Attorneys

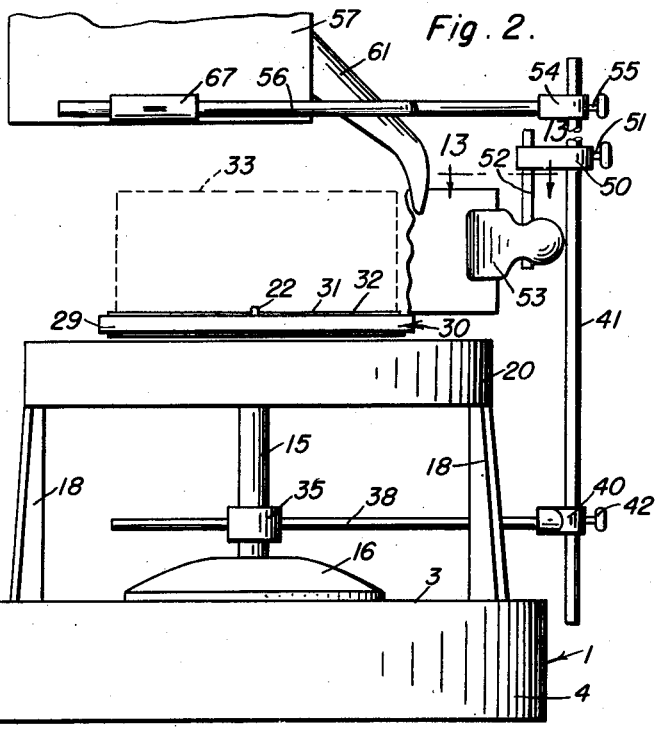
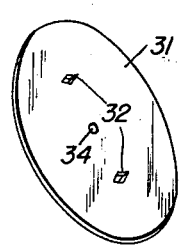
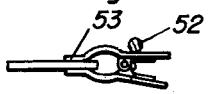
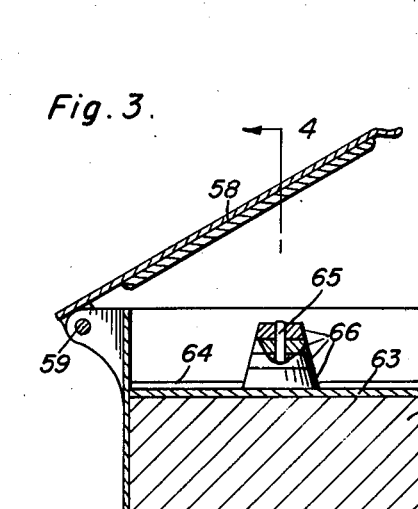
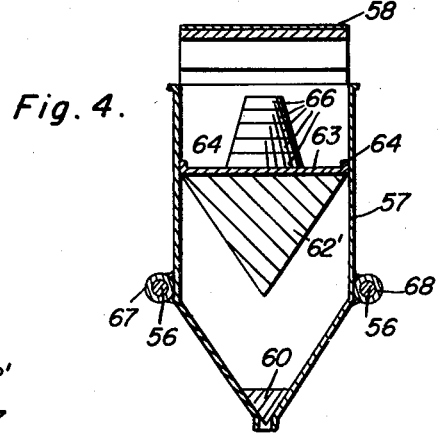
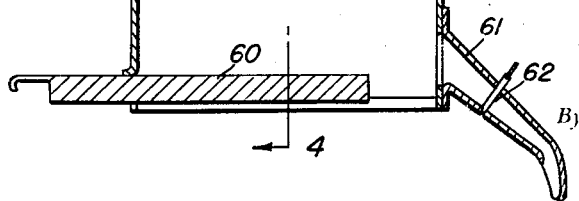

April 11, 1950     C. R. LINDQUIST     2,503,673
CAKE DECORATOR AND FINISHING MACHINE Filed July 21, 1947     3 Sheets-Sheet 3

Inventor

Carl Richard Lindquist

By Clarence A. O'Brien
and Harvey B. Jacobson
Attorneys

Patented Apr. 11, 1950

2,503,673

UNITED STATES PATENT OFFICE 2,503,673

CAKE DECORATOR AND FINISHING MACHINE

Carl Richard Lindquist, Bronx, N. Y., assignor of fifteen per cent to Ruth Lindquist and fifteen per cent to Irvin Wamnes, both of Mount Vernon, N. Y.

Application July 21, 1947, Serial No. 762,358

3 Claims. (Cl. 91—2)

This invention relates to improvements in cake decorators and finishing machines.

An object of the invention is to provide an improved cake decorator and finishing machine for applying icing to cakes when decorating and finishing the same.

Another object of the invention is to provide an improved cake decorating and finishing machine including a base and cake supporting turntable rotatably mounted thereon, together with an electric motor for driving the turntable, and means supported by said support for applying icing to a cake when placed upon said turntable, and the further provision of interchangeable finishing implements also supported by said table for finishing and decorating the cake as icing is applied thereto.

A further object of the invention is to provide an improved cake decorator and finishing machine for simultaneously applying icing to and finishing a cake when supported upon an improved form of electric motor driven rotatable cake supporting turntable.

Another object of the invention is to provide an improved cake decorating and finishing machine which will be highly efficient in operation, and relatively inexpensive to manufacture and produce.

Other objects will appear as the description proceeds.

In the accompanying drawings which form a part of this application,

Figure 1 is a partial vertical sectional view of the improved cake decorating and finishing machine shown with a cake supported upon the rotatable cake supporting turntable;

Figure 2 is a side elevation of the improved cake decorating and finishing machine;

Figure 3 is a vertical sectional view through the icing container and dispensing receptacle;

Figure 4 is a sectional view taken on the line 4—4 of Figure 3;

Figure 9 is a partial sectional view taken on the line 9—9 of Figure 1;

Figure 12 is a perspective view of a cardboard cake supporting disk adapted to be placed upon the cake supporting turntable before the cake is placed thereon, and Figure 13 is a sectional view taken on the line 13—13 of Figure 2.

Like characters of reference are used throughout the following specification and the accompanying drawings to designate corresponding parts.

Figure 10:
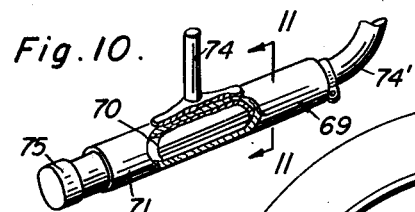
Figure 10 is an enlarged perspective view partly broken away and in section showing an icing or cream dispensing tube.
Figure 5:
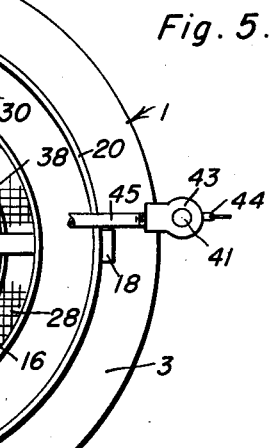
Figure 5 is a top plan view looking down on the improved cake decorating and finishing machine.
Figure 11:
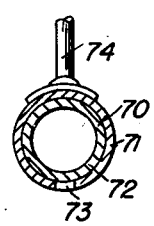
Figure 11 is a sectional view taken on the line 11—11 of Figure 10.
Figure 8:
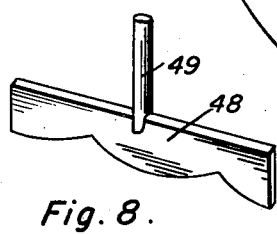
Figure 8 is an enlarged perspective view of one form of icing spreading or finishing implement.
Figure 7:
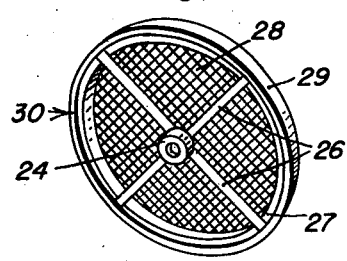
Figure 7 is a perspective view of the perforate cake supporting turntable.
Figure 6:
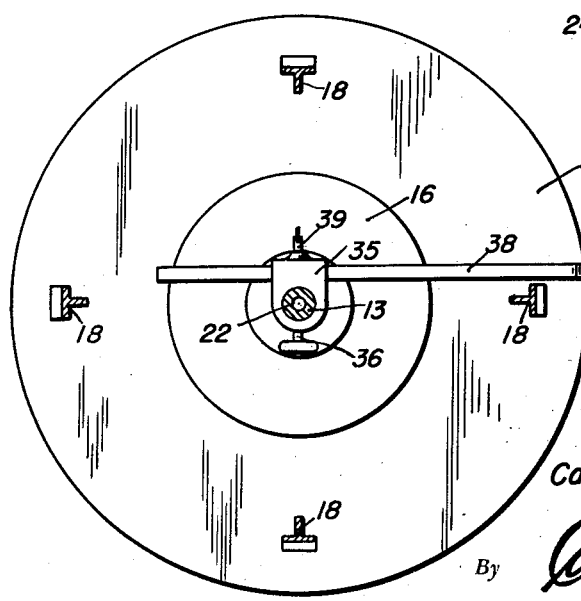
Figure 6 is a partial sectional view taken on the line 6—6 of Figure 1.

In carrying out the invention, there is provided an improved cake decorating and finishing machine including a hollow supporting base or housing generally designated by the reference numeral 1 having a bottom 2 and a top 3 separated by a vertical cylindrical side wall 4.

A small electric motor 5 is secured to the bottom 2 and is adapted to be operated by means of any suitable source of electric current supply (not shown) connected therewith by means of the usual electrical conductors 5'. The motor 5 is provided with an elongated shaft 6 upon which the worm 7 is secured, the outer end of said shaft being rotatably mounted in a bearing 8 supported in the bracket 9 secured to the bottom 2.

A vertical bearing 10 is attached to the bottom 2, and an aligned depending vertical bearing 11 is welded at 12 to the metal top 3 for rotatably supporting the vertical drive shaft 13. A gear 14 is secured to the shaft 13 and meshes with the worm 7 being driven thereby.

The shaft 13 extends upwardly through the top 3, and through a vertical bearing collar 15 which terminates at its lower end with the enlarged disk shaped weight 16 which is welded thereto at 17.

A plurality of upwardly extending T-shape brackets 18 are welded at 19 to the top 3, being arranged at 90° apart, and support the overflow receptacle 20 which is U-shape in cross section, being welded at 21 to the upper ends of said brackets 18.

The upper end of the drive shaft 13 is reduced as at 22, extending a short distance above the vertical bearing collar 15, and supports the washer 23 and the bearing collar 24 spaced apart by the split ring 25.

The bearing collar 24 is formed with radially extending supporting ribs or arms 26 which are secured at their outer ends to an upstanding band or ring 27. A piece of wire mesh fabric 28 is disposed over the band or ring 27, and a larger clamping band or ring 29 is slipped over the band or ring 27 and the edge of the wire mesh fabric 28 to clamp the same tight in position, thus forming the cake supporting turntable generally denoted by the reference numeral 30. The upper reduced end 22 of the drive shaft 13 extends through the wire mesh fabric 28 and a slight distance above the same.

A cardboard cake supporting disk 31 will be provided with the upwardly extending struck out prongs 32 adapted to be embedded in the bottom of a cake 33 when disposed upon said turntable 30, said disk 31 being placed upon the wire mesh fabric 28 of the turntable 30 before the cake 33 is placed upon the said disk 31. A central aperture 34 will be formed in the center of the disk 31 for overlying the reduced end 22 of the drive shaft 13.

A vertically apertured clamping collar 35 will be supported upon the vertical bearing collar 15, and will be provided with a set screw 36 for locking the collar 35 in the desired adjustment.

A transverse bore 37 will be formed through the collar 35 for supporting the laterally extending rod or arm 38 which will be adjustably mounted therein and secured by means of the set screw 39.

A clamping collar 40 will be threaded upon the outer end of the rod or arm 38, and will be vertically bored to receive the vertical rod or arm 41, being held in the desired adjusted position by means of the set screw 42.

A clamping collar 43 similar to the clamping collar 40 will be disposed upon the upper end of the rod or arm 41, and will be provided with a set screw 44 for locking the same in the desired adjusted position.

A transverse inwardly extending rod 45 will be attached to the clamping collar 43 at one end and will support the clamping collar 46 at its inner end. The collar 46 will be vertically bored and provided with a set screw 47 for supporting various types of icing devices, one of which is represented by the reference numeral 48, and each having a supporting stem 49 receivable in the bore in the collar 46.

A collar 50 will be disposed upon the rod or arm 41 being held in the desired adjusted position by means of the set screw 51 and a bore to receive the shank 52 of a cake side icing implement 53.

A collar 54 is adapted to be supported upon the vertical rod or arm 41 and held by the set screw 55. A forked supporting member 56 is adapted to be held by the collar 54 extending inwardly in spaced relation of the cake 33.

An icing reservoir and dispensing receptacle 57 is provided, being of substantially rectangular shape in cross section. A cover 58 is hinged at 59 to the receptacle 57, and a slidable bottom 60 is disposed in the lower end of said receptacle for dispensing the icing in large quantities when desired.

A depending angularly disposed discharge spout 61 is positioned at the lower end of the receptacle 57, and is provided with a cut off valve 62.

A follower 62' of triangular shape in cross section is disposed in the icing receptacle 57 for vertical movement, being provided with a metal guide strip 63 secured to its upper surface and formed with upstanding bearing flanges 64 on its opposite sides engageable with the inner wall of said receptacle 57, serving as bearings for the follower 62' as it moves upwardly and downwardly within the receptacle 57.

An upstanding pin or peg 65 will be supported upon the strip 63 for supporting the several centrally apertured weights 66 for causing the follower 62' to follow downwardly in the receptacle 57 upon the icing when placed therein for discharging the same upon the cake 33 when the control valves are opened.

A pair of oppositely extending horizontal bearing collars 67 and 68 are secured at the bottom of the receptacle 57 for positioning upon the parallel spaced arms of the forked supporting member 56.

If desired, a special icing or cream dispensing tube 69 will be used, the same comprising concentrically arranged barrels 70 and 71 with alignable ports 72 and 73, and with a supporting stem 74 receivable in the clamp 46 on the inner end of the rod 45. A flexible tube 74' will connect the inner end of the dispensing tube 69 with a suitable receptacle (not shown) for containing a supply of icing or cream. A knurled operating head 75 will be formed on the inner barrel 70 for rotating the same to align or disalign the discharge ports 72 and 73.

From the foregoing description, the mode of operation of the improved cake decorator and finishing machine will be as follows: A disk 31 will be placed upon the wire mesh fabric 28 upon the rotatable turntable 30 and a cake 33 to be iced will be disposed upon the disk 31 with the upstanding teeth or prongs 32 embedded in the bottom of said cake. The disk 31 will be centered upon the turntable 30 due to the placing of the same with its central opening 34 over the reduced upper end 22 of the drive shaft 13.

The icing receiving and dispensing receptacle 57 will be filled with the desired amount of icing of a particular color and consistency, and will be supported upon the forked arms 56 above the cake 33 with the discharge spout 61 disposed adjacent the edge of the cake and overlying the same. If it is desired to decorate the upper surface of the cake the icing will be discharged on the top of the cake and the implement 48 will be supported in the clamp collar 46 and the icing will be permitted to flow upon the top surface of the cake while the cake is being rotated with the turntable by means of the electric motor 5. The implement 48 will engage the icing and will be manipulated in such a manner that the icing will be spread as desired over the upper surface of the cake. The implement 53, as clearly illustrated in Figures 2 and 13 will be disposed in position to engage the side of the cake as the icing flows from the icing receptacle 57 down the sides of the cake 33 so that the cake will be thoroughly iced as it is rotated upon its supporting turntable.

The icing or cream dispensing tube 69 may be substituted for the implements 48 and 53, and by manipulating the knurled head 75, the bores 72 and 73 may be brought into alignment to permit the icing or cream to flow therethrough from the suitable source of supply (not shown), and the tube 69 may be manipulated over the cake to produce the desired decoration or design required. Obviously the icing or cream may be colored as desired, so that when a particular type or decorated cake is desired, a photograph or replica of the same may be placed in front of the cake maker and decorator to follow.

It will also be obvious that the several supporting arms and the implements for icing the cake may be adjusted as desired so that any particular design of cake may be quickly and efficiently produced.

It will be apparent that the surplus icing or cream which will flow down the side of the cake 33 being iced will pass through the wire mesh fabric 28 and collect in the overflow receptacle 20, where it may be removed and used for icing other cakes.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A cake decorator and finishing machine comprising a supporting base, a vertical shaft rotatably supported on said base, a cake supporting disk secured to the upper end of said shaft, means carried by said base for driving said shaft, an overflow trough carried by said base beneath said disk, means for retaining a cake on said disk, an icing reservoir and dispensing receptacle, means for retaining said receptacle in vertically adjusted position upon said base, and means vertically adjustable upon said base for supporting an icing implement, said receptacle retaining means including a shield about said shaft and mounted on said base, an apertured collar secured to said shield, a horizontal rod adjustably carried by said collar, a vertical rod adjustably positioned on the free end of said horizontal rod, a bifurcated member adjustably carried on the upper end of said vertical rod, and means for supporting said receptacle on the furcations of said bifurcated member.

2. The combination of claim 1 wherein said icing implement supporting means includes a first collar clamp slidable on said vertical rod, a horizontally extending arm carried by said first collar clamp, and a second collar clamp carried at the free end of said arm for adjustably retaining the shank of an icing implement.

3. The combination of claim 2 wherein said icing reservoir and dispensing receptacle includes a housing, a closure plate hinged to the top of said housing, a delivery spout secured to the bottom of said housing, a door slidable in said housing adjacent said spout, and an icing follower slidable in said housing.

CARL RICHARD LINDQUIST.

REFERENCES CITED

The following references are of record in the file of this patent:

UNITED STATES PATENTS

| Number | Name | Date |
|---|---|---|
| 1,353,386 | Erb | Sept. 21, 1920 |
| 1,447,166 | Alumbaugh | Mar. 6, 1923 |
| 1,753,549 | Cates | Apr. 8, 1930 |
| 1,859,971 | Keck | May 24, 1932 |

FOREIGN PATENTS

| Number | Country | Date |
|---|---|---|
| 490,078 | Great Britain | Aug. 9, 1938 |